(12) United States Patent
Johnson et al.

(10) Patent No.: US 6,367,740 B1
(45) Date of Patent: Apr. 9, 2002

(54) AIR FOIL HAVING A HYBRID LEADING EDGE CONSTRUCTION

(75) Inventors: Scott E. Johnson, Downey; Vann Heng, Buena Park; Guillermo Mas, LaPalma, all of CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 09/572,382

(22) Filed: May 16, 2000

(51) Int. Cl.[7] ................................................. B64C 3/38
(52) U.S. Cl. .................................... 244/45 R; 244/35 R
(58) Field of Search ................................... 244/1 R, 130, 244/129.1, 210, 213, 214, 45 R, 117 A, 117 R

(56) References Cited

U.S. PATENT DOCUMENTS

| | | | |
|---|---|---|---|
| 3,776,139 A | 12/1973 | Leomand | 244/1 R |
| 4,667,906 A | 5/1987 | Suárez et al. | 244/124 |
| 4,880,189 A | 11/1989 | Day | 244/130 |
| 4,919,366 A | 4/1990 | Cormier | 244/160 |
| 4,966,229 A | 10/1990 | Senterfitt et al. | 244/117 A |
| 4,991,797 A | 2/1991 | Miller et al. | 244/117 R |
| 5,263,661 A | 11/1993 | Riley | 244/1 N |
| 5,299,762 A | 4/1994 | Kosson et al. | 244/130 |
| 5,351,917 A | 10/1994 | Bulman | 244/117 A |
| 5,452,866 A | 9/1995 | Bulman | 244/117 A |
| 5,489,074 A | 2/1996 | Arnold et al. | 244/158 A |
| 5,560,569 A | 10/1996 | Schmidt | 244/117 R |
| 5,772,154 A | 6/1998 | Stewart | 244/158 A |
| 5,803,406 A | 9/1998 | Kolodziej et al. | 244/158 A |
| 5,842,666 A | 12/1998 | Gerhardt et al. | 244/15 |
| 6,113,036 A | 9/2000 | deGraffenried | 244/207 |
| 6,119,985 A | 9/2000 | Clapp et al. | 244/172 |

*Primary Examiner*—Michael J. Carone
*Assistant Examiner*—Gabriel S Sukman
(74) *Attorney, Agent, or Firm*—Harness Dickey & Pierce P.L.C.

(57) ABSTRACT

A leading edge component for reducing drag and improving heat sink properties of an air foil. The leading edge component includes a composite tile component with a predetermined aerodynamic shape and a metallic lip portion with high thermal conductivity. The metallic lip portion is secured to a forwardmost edge portion of the composite tile component to thereby form a leading edge of the air foil. The leading edge component is better able to withstand the structural stresses and extremely high temperatures that result while travelling at hypersonic speeds, without a significant increase in weight to the air foil with which the leading edge component is used.

21 Claims, 2 Drawing Sheets

AIR FOIL HAVING A HYBRID LEADING EDGE CONSTRUCTION

TECHNICAL FIELD

This invention relates to air foils, and more particularly to an air foil having a leading edge construction for reducing drag and improving heat sink properties of the air foil.

BACKGROUND OF THE INVENTION

Aircraft operating at hypersonic speeds impose severe thermal and structural stresses on the wings and fuselage of the aircraft. The propulsive force required for the vehicle to maintain a constant velocity must equal the vehicle drag, and thus drag reduction is a very important consideration in aircraft design. It is well known that drag can be reduced by reducing the radius of the leading edge of the wings of the aircraft. However, it is equally well known that a reduction in the radius of the leading edge of a wing increases the amount of heat generated per unit area on the leading edge. For any given operating condition, as the radius of the leading edge decreases, the recovery temperature of the leading edge increases. Thus, the reduction of the radius of the leading edge has been limited by the thermal properties of the material from which the leading edge is constructed. The minimum size of the radius of the leading edge has therefore been limited by the maximum allowable operating temperatures that the materials from which the leading edge of the wing is constructed can withstand.

High lift/drag type vehicles require very sharp leading edges to reduce drag. From preliminary analysis and testing of a Mach 8 type vehicle, it has been determined that only the tip of the leading edge of an air foil suffers from overheating, and that a metallic leading edge resulted in a one thousand degree reduction in temperature. However, fabrication of the entire air foil leading edge from a metal that could withstand the temperature experienced during hypersonic flight speeds would result in an overall weight for the leading edge that is unacceptable for a hypersonic aircraft.

Composite air foil structures that could endure the heat experienced by a leading edge of an air foil during hypersonic flight have been fabricated by the assignee of the present application from a composite material comprising carbon/carbon, and also from other ceramic matrix composites (CMC) comprising carbon silicon carbide (C/SiC), but each was expensive and difficult to fabricate.

Prior approaches to managing the heat experienced by components of an aircraft during very high speed flight have met with limited success. In one approach disclosed in U.S. Pat. No. 3,776,139 a pyrolytic carbon nose for hypersonic vehicles was depicted. The graphite was arranged in slices and oriented so that the direction of least thermal conductivity was along the main axis of the nose, whereas the direction of greatest thermal conductivity was at right angles to the surface of each slice.

In a different approach shown in U.S. Pat. No. 4,667,906, a replaceable tip for an aircraft leading edge was depicted which had a metallic abrasion shield glove removably mounted to the leading edge of the aircraft. Fasteners were used for securing the abrasion shield glove to the leading edge of the aircraft.

In yet another approach disclosed in U.S. Pat. No. 4,966,229, a leading edge construction was depicted with a heat pipe arrangement. The heat pipe included an acute angle leading wedge shaped form with a radiused leading edge. The design used the aircraft engine fuel supply to cool the trailing wedge shape form.

In still another approach disclosed in U.S. Pat. No. 4,991,797, the invention provided a system for selective reduction of an infrared signature of a vehicle subjected to aerodynamic heating. Liquid coolant under pressure vaporized in porous sections of the skin of the vehicle to transpiration-cool the skin. Adjacent downstream solid skin sections were film-cooled by the vapor introduced in the boundary layer.

In U.S. Pat. No. 5,299,762, a leading edge construction included a relatively thin solid plate extending forwardly from the air foil. The plate had an exposed top surface and an exposed bottom surface, and a relatively sharply radiused forward edge forming the leading edge of the air foil. The construction further included slots adjacent to the top and bottom surfaces of the plate for injecting coolant over the top and bottom surfaces of the plate, towards the leading edge, to provide active cooling of the plate.

In U.S. Pat. No. 5,351,917, a transpiration cooling system for avoiding overheating of an air foil was depicted. The air foil was provided with a plurality of apertures and a source of pressurized fluid for providing a slower fluid through the apertures to establish an aerodynamic radius. The aerodynamic radius of curvature of the leading edge was greater than the mechanical radius of curvature of the leading edge such that peak heat flux was independent of the mechanical radius of curvature.

In another application, U.S. Pat. No. 5,772,154, a heat shield was disclosed for thermally insulating the leading edge of a wing of a spacecraft during ascent and re-entry, which included a plurality of rigid tiles. Each tile was formed with a pie-shaped element which interlocked with a complimentarily-formed element of another tile.

In spite of the teachings of the above-mentioned patents, there is still a significant need for a leading edge component which is able to withstand the high temperatures that result from travelling at high Mach speeds without significantly increasing the weight of air foil design.

It is therefore a principal object of the present invention to provide an air foil having a leading edge construction for reducing drag and improving heat sink properties of the air foil. The leading edge design would have the low weight benefit of a composite tile structure with the ability to withstand high temperatures experienced during high speed flight.

It is still another object of the present invention to provide a leading edge construction for an air foil that includes a composite material such as high density AETB formed to a predetermined aerodynamic shape, and a metallic component with high thermal conductivity secured to a forwardmost portion of the composite material to thereby form a "hybrid" leading edge component. This leading edge component would have the low weight benefit of composite tile construction with the ability to withstand the extremely high temperatures experienced during high speed flight.

It is still another object of the present invention to address the concerns regarding high temperature tolerance and low weight with a leading edge construction that is easily fabricated in a cost effective manufacturing process.

SUMMARY OF THE INVENTION

The present invention relates to an air foil having a leading edge component for reducing drag and improving the heat sink properties of the air foil. The leading edge component comprises a composite material formed in a predetermined aerodynamic shape and a metallic component with high thermal conductivity which is secured to a forwardmost portion of the composite material. This construction provides a leading edge component which is able to withstand the high temperatures that result from travelling at very high speeds without adding a tangible amount of weight to the overall air foil.

In a preferred embodiment of the invention, the apparatus of the present invention includes a composite tile component, preferably Reaction Cured Glass (RCG)/Toughened Unipiece Fibrous Insulation (TUFI) high density AETB tile or a suitable equivalent. A metal lip portion, preferably formed from Inconel or other suitable alloy, is secured to a forwardmost portion of the leading edge component. The metal lip portion is secured to the composite tile component by an adhesive, while the blade of the metallic insert is allowed to expand thermally in a slot machined into the AETB-tile.

In an alternative preferred embodiment the apparatus of the present invention comprises a composite tile component having at least one bore. A metallic lip portion has an enlarged portion which engages with the bore to enable the lip portion to be secured to the tile component without adhesives.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

Figure 1:
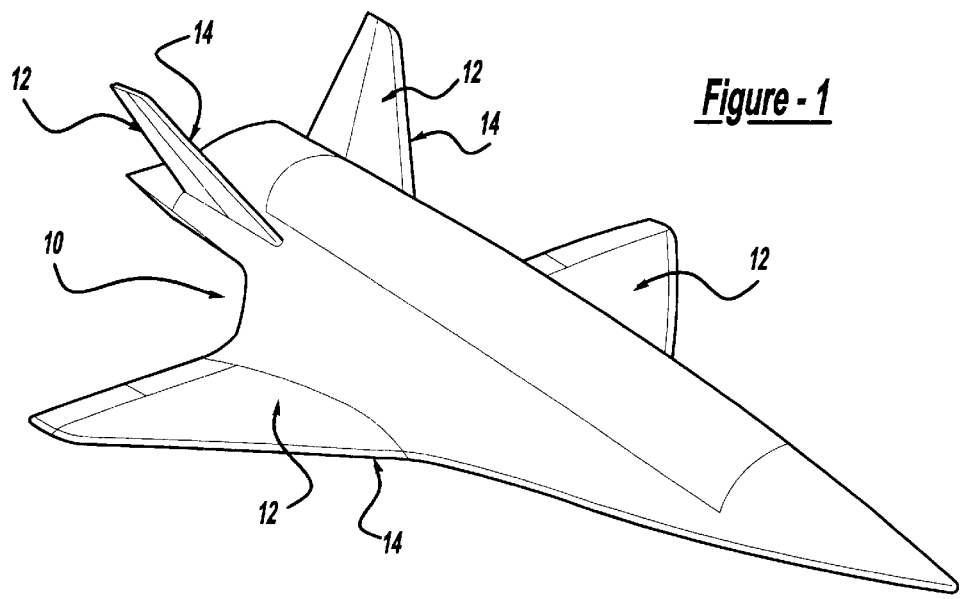
FIG. 1 is a simplified perspective drawing of an aircraft having a plurality of air foils.

In FIG. 1 an aircraft 10 is shown having a plurality of air foils 12. Each air foil 12 has a leading edge portion 14. The aircraft 10 is an aircraft capable of flying at hypersonic speeds (i.e., up to Mach 8 or higher). Accordingly, the leading edge portions 14 of each air foil 12 are required to be able to withstand extremely high temperatures and structural stresses.

Figure 2:
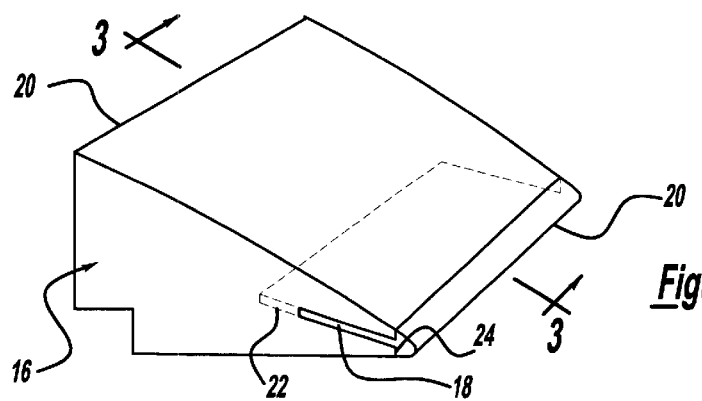
FIG. 2 is an enlarged perspective view of one leading edge tile for use in forming an air foil, in accordance with a preferred embodiment of the present invention.

Each leading edge portion 14 is made up of a plurality of leading edge components disposed adjacent one another in side-by-side fashion. In FIG. 2, one such leading edge component 16 is shown in greater detail. The leading edge component 16 comprises a composite tile component 18 and a metallic lip portion 20. The metallic lip portion 20 is inserted into a slot 22 formed in a forwardmost edge surface 24 of the tile component 18.

Figure 4:
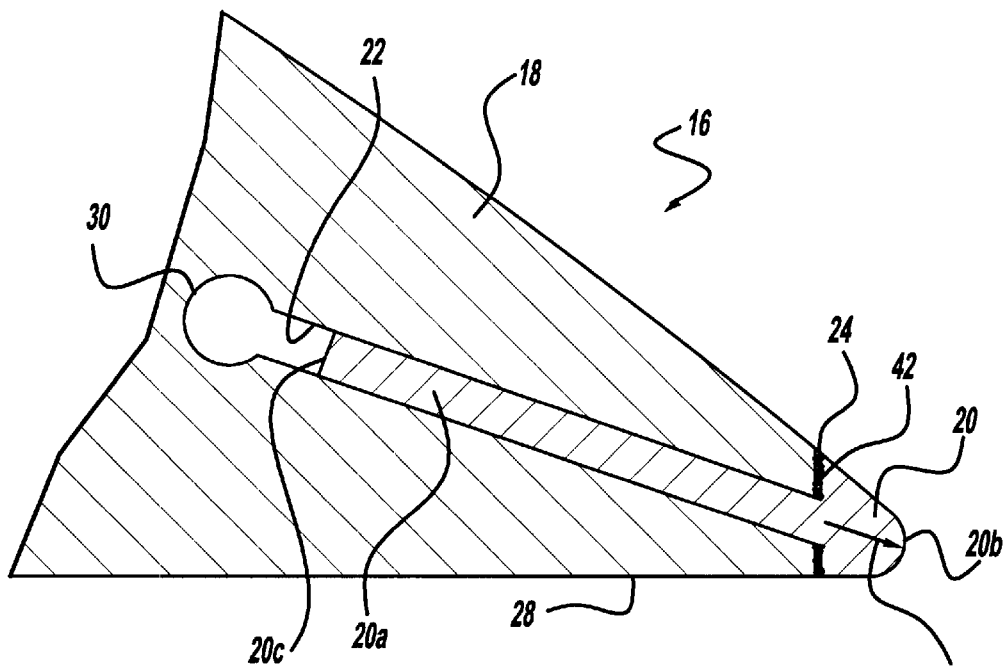
FIG. 4 is an enlarged view of circled portion 4 in FIG. 3.

Referring to FIG. 4, the construction of the leading edge component 16 can be seen in still greater detail. A composite material such as RCG/TUFI coated AETB-20 tile is preferably used to manufacture the tile component 18. The metallic lip portion 20 is preferably comprised of Inconel, Haynes™ 230 alloy, or any other suitable alloy. The tile component 18 is oriented during machining to take advantage of its anisotropic properties with respect to thermal conductivity. The tile component 18 is oriented so that the direction of thermal conductivity extends along tile component 18 and is parallel to the chord of the air foil 12. This is done to maximize the heat sink effect within the tile component 18.

Referring further to FIG. 4, once the outer mold line (OML) of the tile component 18 is complete, a forwardmost portion is then cut off to produce the forwardmost edge surface 24, which extends perpendicular to a lower surface 28 of the tile component. An approximate 0.1875 inch (4.76 mm) diameter stress relief hole 30 is drilled into the tile component 18 parallel to the edge surface 24 (i.e., into the paper in the drawing of FIG. 4) approximately 3.0 inches (76.2 mm) inwardly of the edge surface 24.

Referring further to FIG. 4, a preferably 0.125 inch (3.175 mm) width cut is made into the tile component 18 at the edge surface 24 to form the slot 22. The slot 22 extends back approximately 3.0 inches to where the stress relief hole 30 was drilled. An optional filler (not shown) may be inserted into the slot 22 and a coating (not shown) may also be applied to the tile component 18. The metallic lip portion 20 has a blade portion 20a which is inserted into the slot 22.

Figure 3:
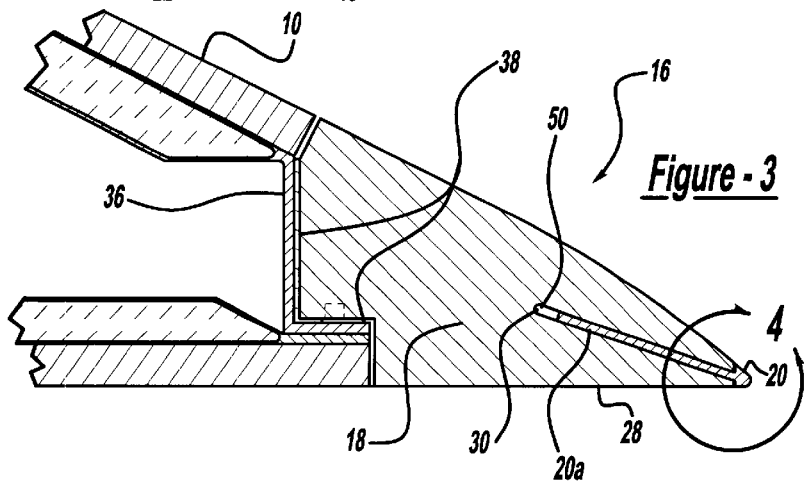
FIG. 3 is a cross-sectional view of the leading edge tile of FIG. 2 taken in accordance with section line 3—3 in FIG. 2.

Referring briefly to FIG. 3, the tile component 18 is bonded to the air foil 12 with no fasteners required. Standard tile bonding methods and materials are used to bond the high density AETB tile to the air foil longeron 36. A strain isolation pad (SIP) 38 of preferably approximately 0.030–0.090 inch (0.762 mm–2.29 mm) thickness is RTV bonded between the tile component 18 and the longeron 36. An HTA (High Temperature Advanced Flexible Reusable Surface Insulation) blanket 40 is used to provide an outer surface for the air foil 12.

Referring further to FIG. 4, the metallic lip portion 20 is bonded to the edge surface 24 of the tile component 18 by a suitably high strength, high temperature adhesive. More preferably, an aluminum adhesive is used to bond only the front inside surface 42 of the metallic lip portion 20, thus allowing its blade portion 20a to expand and contract within the slot 22. This prevents inducing structural stresses in the tile component 18. The metallic lip portion 20 preferably has a radius of curvature at its outermost edge 20b of less than about 0.125 inch (3.175 mm), as indicated by arrow 44, thus forming the leading edge of the air foil 12.

The leading edge component 16 thus forms a construction which is not only able to handle the significant structural stresses experienced during hypersonic flight of the aircraft 10, but which can also withstand the very severe thermal stresses experienced during such flight. The leading edge component 16 further does not add appreciably to the overall weight of the leading edge portion of the air foil 12, and can be manufactured using widely available manufacturing techniques.

Figure 5:
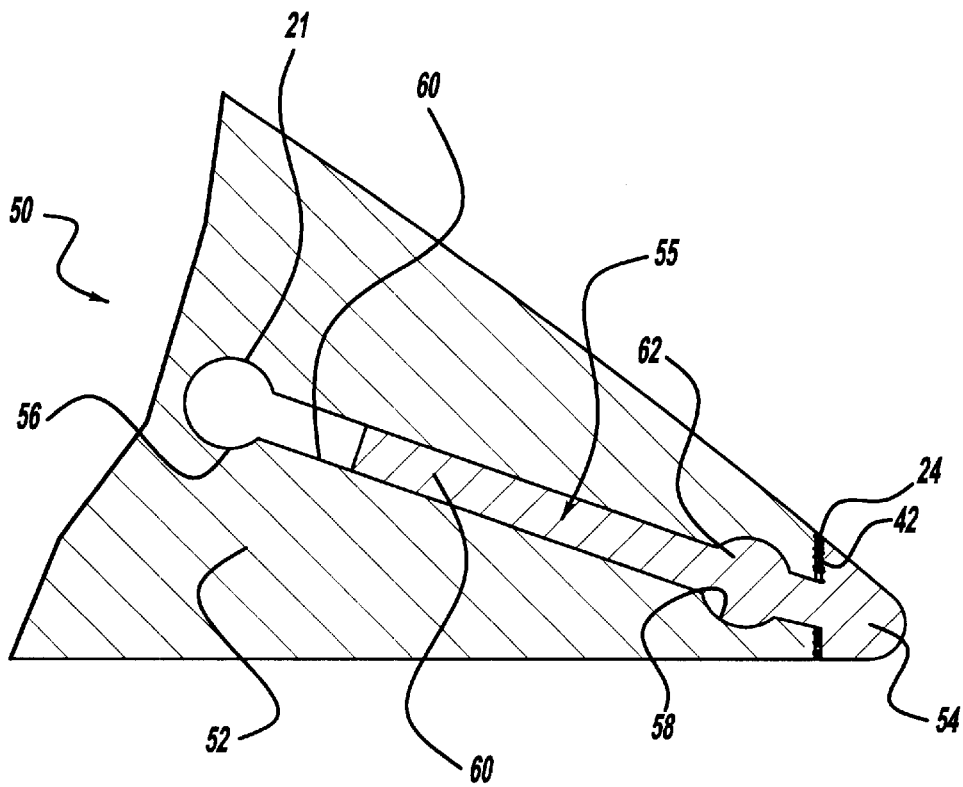
FIG. 5 is a cross-sectional side view of an alternative preferred embodiment of the present invention incorporating a metallic lip which is secured to a leading edge tile without the use of adhesives.

Referring now to FIG. 5, a leading edge component 50 in accordance with an alternative preferred embodiment of the present invention is shown. Leading edge component 50 also includes a tile component 52 and a metallic lip portion 54. However, the tile component 52 includes a pair of enlarged stress relief holes 56 and 58 formed so as to intersect a slot 60. The metallic lip portion 54 also includes a blade portion 55 having an enlarged portion 62 preferably along its entire length.

The lip portion 54 is inserted into the slot 60 from one side end of the tile component 52 (i.e., into the paper in the drawing of FIG. 5) such that the enlarged portion 62 of the lip portion 54 engages the hole 58. This enables the lip portion 54 to be secured to the tile component 52 without the use of any adhesives. Both of the leading edge components 50 and 16 have an overall length of between about six to twelve inches, but it will be appreciated that larger or smaller length leading edge components could be fabricated to meet the needs of a specific application.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An air foil having a leading edge construction for reducing drag and improving heat sink properties of the air foil, the air foil comprising:
    a tile component comprising a fibrous composite material formed into a substantially complete leading edge portion for the air foil, and adapted to be secured to a main body portion of the air foil, the tile component having a forwardmost edge portion; and
    a solid, non-hollow metallic lip portion secured t o the forwardmost edge portion for providing reduced drag and increased thermal conductivity to the leading edge of the air foil.

2. The air foil according to claim 1, wherein the tile component comprises a ceramic matrix composite (CMC).

3. The air foil according to claim 2, wherein the tile component comprises high density AETB.

4. The air foil according to claim 1, wherein the metallic lip portion comprises Inconel.

5. The air foil according to claim 1, wherein the metallic lip portion comprises Haynes™ 230 alloy.

6. The air foil according to claim 1, wherein:
    the forwardmost edge portion of the tile component comprises a slot formed therein;
    wherein at least a portion of the metallic lip portion is inserted into the slot; and
    wherein a bonding agent is used to secure the metallic lip portion to the tile component.

7. The air foil according to claim 1, wherein the tile component is formed such that anisotropic properties thereof maximize heat sinking efficiency of the composite material of the tile component.

8. The air foil according to claim 1, wherein the metallic lip portion is bonded to the forwardmost edge portion by a high temperature adhesive.

9. The air foil according to claim 8, wherein the high temperature adhesive comprises an alumina cement.

10. The air foil according to claim 6, wherein the metallic lip portion is secured to the forwardmost edge portion by interlocking with a portion of the slot.

11. The air foil according to claim 6, wherein the metallic lip portion includes a radiused outermost edge having a radius of curvature of less than about 0.125 inch.

12. A leading edge component adapted to be secured to an air foil of an aircraft to form a leading edge portion for the air foil, the leading edge component comprising:
    a tile component having a slot formed therein, the slot opening to an edge portion of the tile component;
    a metallic lip portion having a blade portion, the blade portion being inserted into the slot such that the lip portion forms an outermost leading edge of the tile component; and
    wherein the blade portion and the slot have cooperating structure for securing the blade portion within the slot.

13. The leading edge component of claim 12, wherein the metallic lip portion is secured to the tile component by an adhesive.

14. The leading edge component of claim 12, wherein the metallic lip portion is secured to the tile component by an interlocking of an enlarged portion of the blade portion with an enlarged portion of the slot.

15. A method of forming an air foil having reduced aerodynamic drag and improved heat sink properties, the method comprising the steps of:
    providing a tile component comprised of a fibrous composite material in the form of a leading edge portion, adapted to be secured to a main portion of the air foil; and
    securing a substantially solid, non-hollow metallic lip portion to an edge portion of the tile component to thereby form a leading edge for the air foil operable to conduct heat and reduce aerodynamic drag experienced by the air foil during flight of an aircraft with which the air foil is associated.

16. The method of claim 15 wherein the method further comprises the step of forming a slot in the edge portion of the tile component; and
    securing at least a portion of the metallic lip portion within the slot.

17. The method of claim 15, wherein the method further comprises the step of securing the metallic lip portion to the tile component by bonding with a high temperature adhesive.

18. The method of claim 15, wherein the method further comprises the step of securing the metallic lip portion by interlocking a blade portion of the metallic lip portion with a portion of the slot.

19. The method of claim 15, wherein the step of providing the metallic lip portion comprises the step of providing a metallic lip portion having an outermost leading edge having a radius of curvature no greater than approximately 0.125 inch.

20. The method of claim 15, wherein the step of providing a tile component comprises providing a tile component formed of high density AETB tile.

21. The method of claim 15, wherein the step of providing a metallic lip portion comprises the step of providing a metallic lip portion formed from Inconel.

* * * * *